Sept. 8, 1925.

B. A. HAWKS

FLOAT

Filed Jan. 9, 1925

Inventor
Burton A. Hawks
By L. B. James
Attorney

Sept. 8, 1925.
B. A. HAWKS
FLOAT
Filed Jan. 9, 1925
1,552,603
2 Sheets-Sheet 2
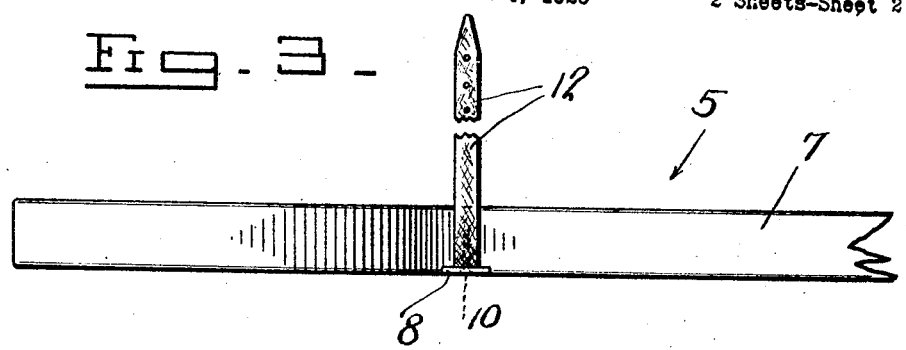
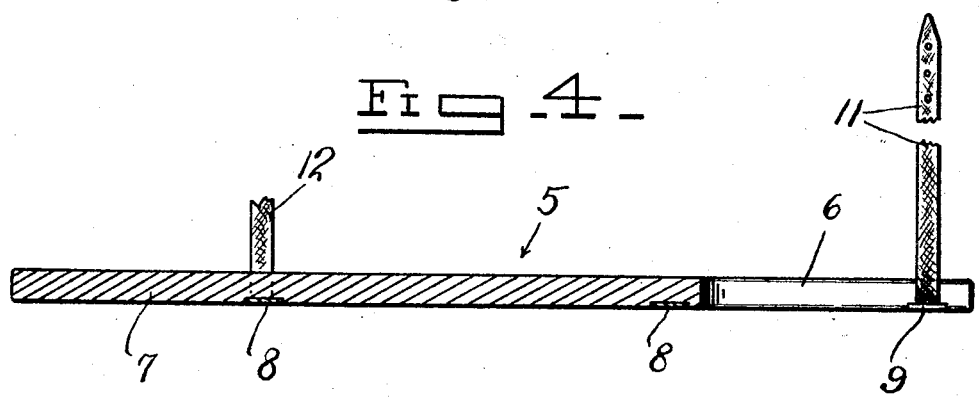
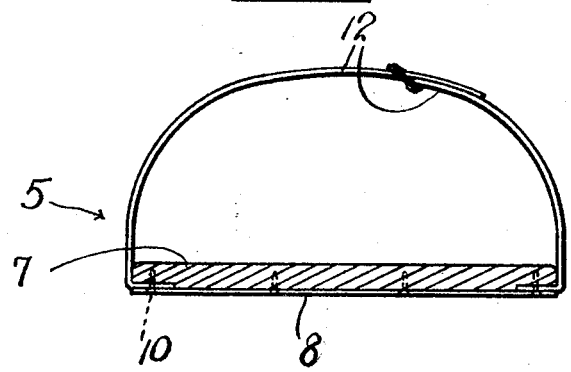
Inventor
Burton A. Hawks
By L. B. James
Attorney Patented Sept. 8, 1925.

1,552,603

UNITED STATES PATENT OFFICE.

BURTON ALLEN HAWKS, OF LAKE WORTH, FLORIDA.

FLOAT.

Application filed January 9, 1925. Serial No. 1,394.

*To all whom it may concern:*

Be it known that I, BURTON ALLEN HAWKS, a citizen of the United States, residing at Lake Worth, in the county of Palm Beach and State of Florida, have invented new and useful Improvements in Floats, of which the following is a specification.

This invention relates to swimming devices and more particularly to a float.

The primary object of this invention resides in the provision of means adapted to assist in teaching individuals to swim by preventing inaction of certain portions of their bodies and permitting freedom of action of certain members of their bodies.

Another object of this invention resides in the provision of a float adapted to be secured to the body of an individual so that bending and drawing the legs toward the body will be obviated during the leg stroke when learning to swim.

A further object of this invention resides in the provision of a float adapted to be secured to the body of an individual, learning to swim, so the body will remain straight and inaction of the legs above the knees will be established.

A still further object of this invention resides in the provision of a float, for assisting in teaching swimming, adapted to be made in various sizes to approximately conform to the shape of an individual's body and upper portions of the legs.

In addition to the aforesaid objects, this invention resides in the provision of a float, for assisting in teaching swimming, adapted to be readily and comfortably secured to the body of an individual so the necessary motions of the limbs will be produced for swimming and those motions of the body which most frequently cause drowning with beginners abolished.

Aside from the foregoing objects, this invention resides in the provision of a float, for assisting in teaching swimming, consisting of an embodiment of elements which, when assembled, produce a strong and buoyant device adapted to be secured in operative position on an individual to prevent drowning.

With these and other objects in view, this invention resides in certain novel features of construction, arrangement and combination of elements to be hereinafter set forth in the specification, illustrated in the accompanying drawings and pointed out in the appended claim and, while the disclosure depicts my present conception of the invention, the right is reserved to make such changes in construction as come within the scope of the claim.

In the accompanying drawings forming a part of this application:

Fig. 3 is a side view thereof.

Fig. 4 is a sectional view on line 4—4 of Fig. 2.

Fig. 5 is a similar view on line 5—5 of Fig. 2.

Figure 1:
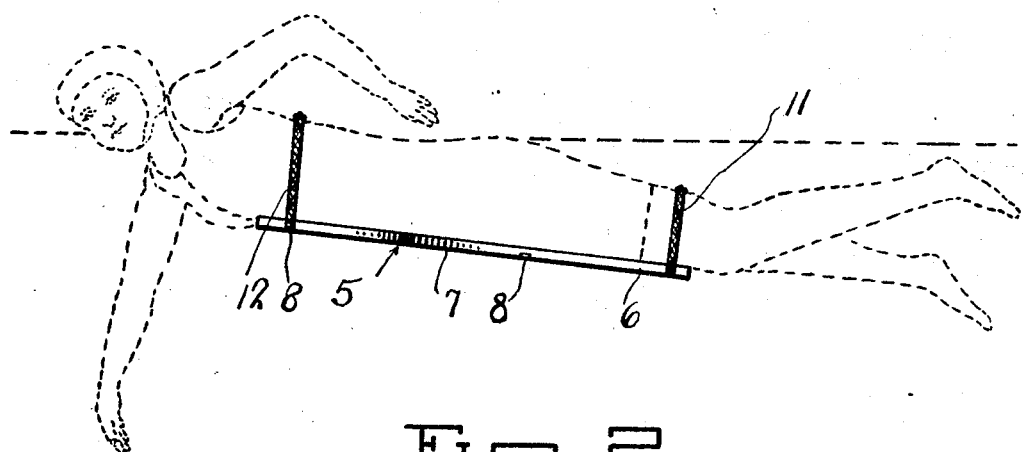
Fig. 1 is a view of an individual in the water with a float, constructed in accordance with this invention, secured in one of its operative positions on his body.
Figure 2:
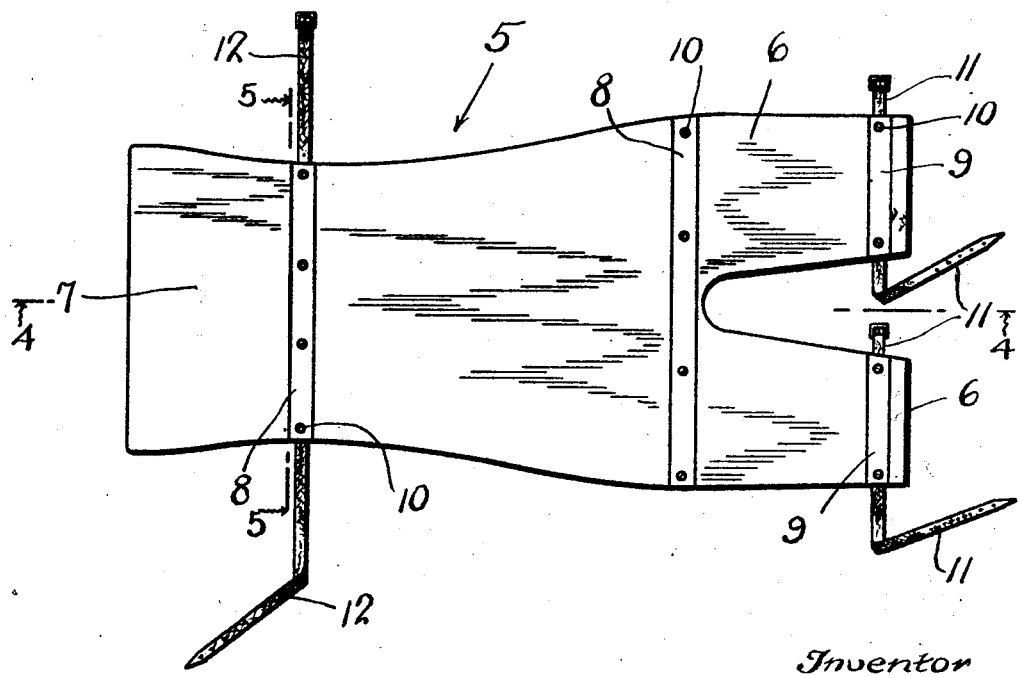
Fig. 2 is an enlarged plan view of a float forming the subject matter of this invention.

In the present embodiment of this invention, the numeral 5 designates a board of any suitable buoyant material, preferably shaped to conform approximately to the standard pattern of individuals of different sizes, the same having leg portions 6 extending from a body portion 7.

The body portion 7 is strengthened through the instrumentality of suitable reinforcing bands 8 while the leg portions are strengthened through the provision of reinforcing bands 9, the same as well as bands 8 are secured to the board by fastening elements 10.

Separable straps 11 are fastened to each of the leg portions 6 in close proximity to the reinforcing bands thereof to establish secure attachment of the straps to the board.

Separable body straps 12 are secured to the board in close proximity to one of the reinforcing bands thereof, the same preferably being disposed adjacent that end of the board remote from the leg portions thereof.

With a float constructed as aforesaid, the same is applied for utilization on the body of an individual by buckling the body straps around the body in close proximity to the shoulders and the leg straps in close proximity to and above the knees, whereupon inaction of the body between the knee and body straps will be established without interfering with the freedom of action by the limbs therebeyond.

With this invention fully set forth, it is manifest that a float for assisting in teaching swimming is produced and, through the particular arrangement of the elements, an individual is compelled to follow instructions as to the motions of his limbs.

Having thus described my invention, what I claim and desire to protect by Letters Patent is:

A float of the character set forth comprising a buoyant body portion, reinforcing bands thereon, leg portions extending therefrom, reinforcing bands thereon, and straps secured to the body and leg portions.

In testimony whereof I affix my signature.

BURTON ALLEN HAWKS.